United States Patent
Lu et al.

(10) Patent No.: US 11,921,368 B2
(45) Date of Patent: Mar. 5, 2024

(54) ELECTRONIC DEVICES HAVING ANTIGLARE FILMS WITH TRANSPARENT APERTURES

(71) Applicant: Apple Inc., Cupertino, CA (US)

(72) Inventors: Zhijian Lu, San Jose, CA (US); Jun Qi, San Jose, CA (US); Xiangtong Li, Fremont, CA (US); Xinyu Zhu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/482,231

(22) Filed: Sep. 22, 2021

(65) Prior Publication Data
US 2023/0091694 A1 Mar. 23, 2023

(51) Int. Cl.
*G02F 1/1335* (2006.01)
*G02B 1/11* (2015.01)

(52) U.S. Cl.
CPC .......... *G02F 1/133502* (2013.01); *G02B 1/11* (2013.01); *G02F 1/133512* (2013.01); *G02F 1/133528* (2013.01)

(58) Field of Classification Search
None
See application file for complete search history.

(56) References Cited

U.S. PATENT DOCUMENTS

| | | | |
|---|---|---|---|
| 7,997,743 B2 | 8/2011 | Suzuki et al. | |
| 2012/0300304 A1* | 11/2012 | Gollier | C03C 15/00 359/599 |
| 2014/0225131 A1* | 8/2014 | Benson | G06F 1/1643 257/82 |
| 2017/0187934 A1* | 6/2017 | Kwak | G02F 1/1333 |
| 2018/0273425 A1* | 9/2018 | Mishiro | C09D 5/006 |
| 2020/0124908 A1* | 4/2020 | Mishiro | C03C 19/00 |
| 2021/0080778 A1* | 3/2021 | Hatano | G02F 1/133502 |

FOREIGN PATENT DOCUMENTS

WO   WO-2021177169 A1 * 9/2021
WO   WO-2021177170 A1 * 9/2021

* cited by examiner

*Primary Examiner* — Shan Liu
(74) *Attorney, Agent, or Firm* — Treyz Law Group, P.C.; David K. Cole (57) ABSTRACT

An electronic device may be provided with a display. The display may be overlapped by an antiglare film. The antiglare film may have a rough surface to diffuse incident light, thereby reducing glare. Additionally, the antiglare film may have a smooth portion that forms a transparent window and allows light to pass through undiffused. The electronic device may include a light-based component, such as a camera, that receives undiffused light through the transparent window. By overlapping the light-based component with the transparent window, the light-based component may receive the light in an unimpeded manner, thereby making more accurate measurements of the light. The display may have one or more display layers, such as opaque masking layers or polarizers, with openings that are aligned with the transparent window. The light-based component may receive the light through these openings so that the light is not absorbed or polarized before reaching the component.

19 Claims, 8 Drawing Sheets

ELECTRONIC DEVICES HAVING ANTIGLARE FILMS WITH TRANSPARENT APERTURES

BACKGROUND

This relates generally to electronic devices, and, more particularly, to electronic devices with antiglare films.

Electronic devices such as laptop computers, cellular telephones, and other equipment are sometimes provided with displays. In some devices, displays are covered with antiglare films, which reduces/prevents glare when a user views the displays.

It can be challenging to incorporate desired functionality into devices such as these. For example, it may be difficult to incorporate light-based devices such as light sensors and cameras into a device with a display covered by an antiglare film, as the antiglare film may diffuse light incident on the light sensors and cameras.

SUMMARY

An electronic device may be provided with a display. The display may have a display cover layer. The display cover layer may overlap liquid crystal display layers or display layers of other display technologies. An antiglare film may be provided over the display cover layer or otherwise overlap the display to reduce or eliminate glare by diffusing light incident on the film.

The display may have an active area with pixels and an inactive area without pixels (or with dummy pixels). Light-based components, such as cameras, ambient light sensors, image sensors, or other light sensors may be provided under the display cover layer and/or other display layers in the inactive area.

A transparent window may be formed in the antiglare film in the inactive area. One or more of the light-based components may be mounted in the electronic device in alignment with the transparent window. A polarizer layer may overlap the active and inactive areas of the display, and a masking layer may overlap the inactive area of the display. An opening in the polarizer, an unpolarized portion, or other window of the polarizer, as well as an opening or window in the masking layer, may be aligned with the transparent window.

DETAILED DESCRIPTION

Figure 1:
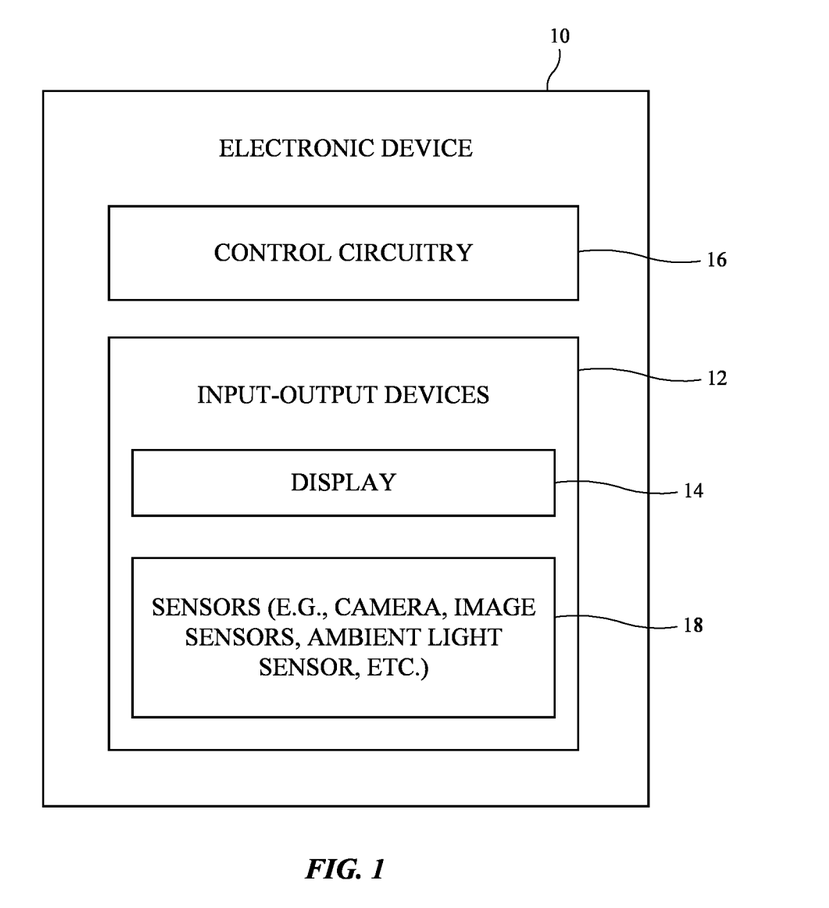
FIG. 1 is a schematic diagram of an illustrative electronic device in accordance with an embodiment.

An illustrative electronic device of the type that may be provided with one or more light-based devices under a display with an antiglare film is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as nonvolatile memory (e.g., flash memory or other electrically-programmable-read-only memory configured to form a solid state drive) and volatile memory (e.g., static or dynamic random-access-memory). Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, light-emitting diodes for components such as status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 12 may also include sensors 18. Sensors 18 may include a capacitive proximity sensor, a light-based proximity sensor, a camera, an ambient light sensor, a light-based fingerprint sensor, a fingerprint sensor based on a capacitive touch sensor, a magnetic sensor, an accelerometer, an image sensor, a force sensor, a touch sensor for a button or track pad, a temperature sensor, a pressure sensor, a compass, a microphone, a visible digital image sensor (visible-light camera), an infrared digital image sensor (infrared-light camera), and/or other sensors, and/or multiple sensors mentioned in the list above.

Sensors 18 may be used to gather user commands (e.g., commands that direct control circuitry 16 to take action), may be used to gather information on the environment surrounding device 10 (e.g., information on ambient light levels, ambient temperature, ambient atmospheric pressure, etc.), and may be used in performing biometric authentication operations (e.g., using a fingerprint sensor, using visible and/or infrared cameras, using voice recognition, etc.). After a user has been authenticated using biometric authentication operations and/or after entering a password or supplying other information to device 10, control circuitry 16 may provide the user with access to the features of device 10 (e.g., circuitry 16 may allow the user to make telephone calls, access stored information in storage in device 10, send text messages or email messages, etc.). In some cases, it may be desirable to incorporate one or more sensors 18 under a portion of display 14. An example of a device with a sensor under a portion of a display is shown in FIG. 2.

Figure 2:
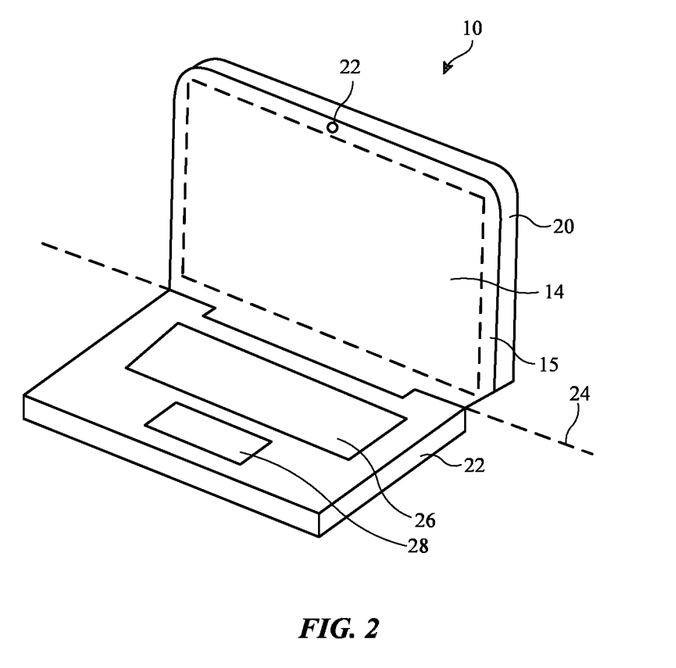
FIG. 2 is a perspective view of an illustrative electronic device having a keyboard, a display, and a transparent window in an inactive portion of the display for underlying light-based components, such as light sensors, in accordance with an embodiment.

As shown in FIG. 2, electronic device 10 may be a portable computer or other electronic equipment that has a display, such as display 14. Display 14 may be mounted in upper housing portion 20. The housing of electronic device 10, which is defined by upper housing portion 20 and lower housing portion 22, may be formed from a unitary piece of material (e.g., metal, plastic, glass, or fiber composite materials) or may be formed from multiple structures that have been mounted together using adhesive, fasteners, and/or other attachment mechanisms. For example, upper housing portion 20 and lower housing portion 22 may be formed from frame members and other internal supports to which external plates, housing sidewalls, bezel structures, and other structures are mounted.

Because housing portion 20 may be used to house display 14, housing portion 20 may sometimes be referred to as a display housing. Display housing 20 may be attached to housing portion 22 (sometimes referred to as a main unit or base housing) using hinge structures, so that display housing 20 may rotate relative to main housing 22 around hinge axis 24. Device 10 may include ports for removable media, data ports, keys such as keyboard 26, input devices such as track pad 28, microphones, speakers, sensors, status indicators lights, etc. as desired.

Display 14 may have an active portion and an inactive portion (also referred to as the active area and inactive area, respectively, herein). Inactive portion 15 of display 14 may have a rectangular ring shape or other suitable shape and may form a border around the periphery of display 14, as shown by the dashed line in FIG. 2. In other words, inactive portion 15 may surround the active region of display 14, either partially or entirely. However, inactive portion 15 may be adjacent to a single portion of the active area of display 14, if desired.

Image pixel array elements such as liquid crystal image pixels, organic light-emitting diode image pixels, or other active image pixel structures may be used in the active portion of display 14 to present images to a user of device 10. Inactive portion 15 is generally devoid of image pixel elements and does not participate in forming images for a user. To hide unsightly internal components from view, internal components in inactive portion 15 may be blocked from view using an opaque masking layer such as a layer of ink.

To ensure that users of electronic device 10 do not experience glare when viewing display 14 and inactive area 15, electronic device 10 may include an antiglare film that overlaps both the active area of display 14 and inactive area 15. The antiglare film may diffuse light that is incident on the film, thereby reducing unsightly reflections.

Device 10 may have components that are formed in inactive device region 15. To accommodate components that require light, such as cameras, image sensors, ambient light sensors, infrared light-emitting diodes for providing illumination, optical proximity sensors having an infrared light-emitting diode and a corresponding infrared light detector for detecting emitted infrared light that has reflected from an external object, and/or other light-based components, window 22 may be formed in inactive area 15. Window 22 may include a transparent window in the antiglare film, an opening in the opaque masking layer, and/or openings in other display layers of display 14. These windows and openings may be aligned with the underlying light-based components to allow light to pass to the components unimpeded by the overlying layers.

Although FIG. 2 shows display 14 on one surface of upper housing portion 20, this is merely illustrative. Display 14 may be formed on multiple surfaces of upper housing portion 20 and/or may be formed on or more surfaces of lower housing portion 22, if desired. In one example, keyboard 26 and/or touch pad 28 may be formed from one or more displays in lower housing portion 22.

Device 10 is not limited to a single window 22. There may be any suitable number of windows 22 in display 14 (e.g., at least one, at least two, at least three, at least four, two, four, fewer than ten, 3-7, etc.). In general, there may be any suitable number of windows 22 in display 14, and these windows may be used in transmitting emitted and/or received visible light, infrared light, and/or other light.

Although FIG. 2 has shown electronic device 10 as a device having a display and keyboard in separate housing portions, which may be a device such as a laptop computer, this is merely illustrative. Another example of electronic device 10 is shown in FIG. 3.

Figure 3:
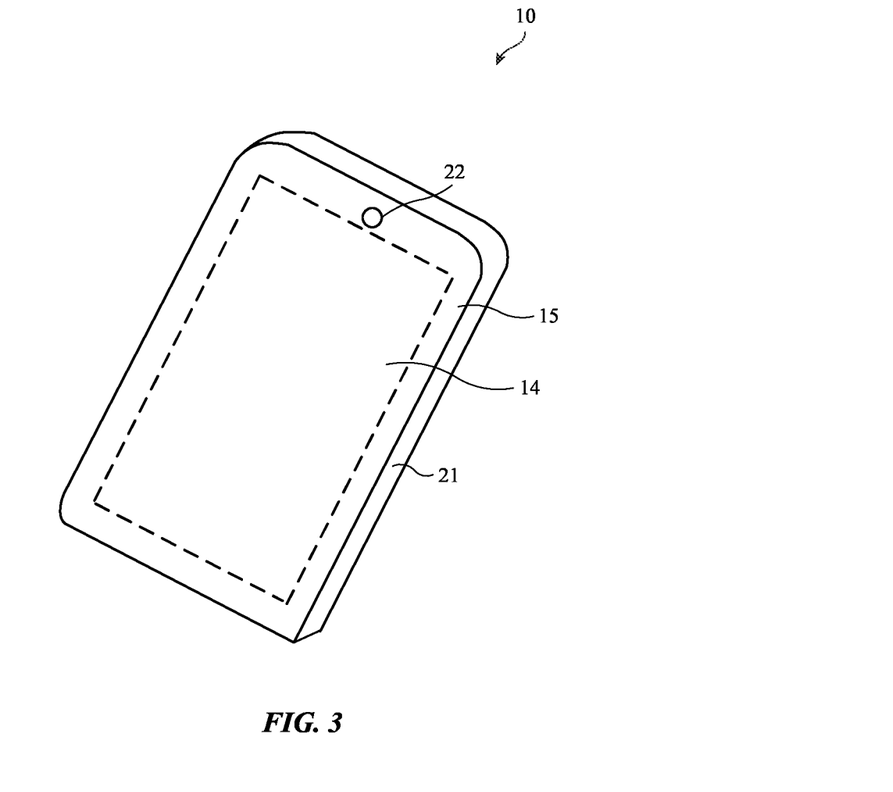
FIG. 3 is a perspective view of an illustrative electronic device having a display and a transparent window for light-based components, such as light sensors, in accordance with an embodiment.

As shown in FIG. 3, electronic device 10 may be a portable electronic device such as a handheld device (e.g., a cellular telephone or tablet computer) having opposing front and rear faces. In the example of FIG. 3, device 10 may include a display, such as display 14, mounted in housing 21 on the front face of device 10. Configurations in which display 14 is mounted in other portions of an electronic device may be used, if desired.

Device 10 may have opening/window 22 in a portion of display 14 (such as in inactive area 15) to allow light to reach underlying components, such as cameras, image sensors, ambient light sensors, or other light-based components. Window 22 may include a transparent window in an antiglare film that overlaps display 14, an opening in an opaque masking layer of display 14, and/or an opening or unpolarized region in a polarizer in display 14.

As discussed above in connection with FIG. 2, opening/window 22 may be formed in inactive area 15 of display 14. Alternatively or additionally, opening/window 22 may be partially or fully surrounded by the active area of display 14 (i.e., partially or fully surrounded by pixels of display 14).

Additionally, device 10 is not limited to a single window 22. Device 10 may have any desired number of windows that overlap the inactive area and/or the active area of display 14.

Housing 21, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 21 may be formed using a unibody configuration in which some or all of housing 21 is machined or molded as a single structure or may be formed using multiple structures (e.g., an internal frame structure, one or more structures that form exterior housing surfaces, etc.).

Display 14 may be protected using a display cover layer such as a layer of transparent glass, clear plastic, sapphire, or other clear layer. Display 14 may be a liquid crystal display, may be an electrophoretic display, may be an organic light-emitting diode display or other display with an array of light-emitting diodes, may be a plasma display, may be an electrowetting display, may be a display based on microelectromechanical systems (MEMs) pixels, or may be any other suitable display. Illustrative configurations in which display 14 is a liquid crystal display may sometimes be described herein as an example.

Regardless of the configuration of electronic device 10 and the one or more displays 14, it may be desirable to include an antiglare film that overlaps display 14. Antiglare films may diffuse light incident on display 14, thereby reducing or eliminating the glare seen by a user of electronic device 10 when viewing the display. It may be desirable to apply these antiglare films over both the active and inactive areas of displays 14 to maintain consistent appearances across the two areas. However, if optical components are included under display 14 in the active area or inactive area, light incident on the optical components may be diffused by the overlying antiglare films, thereby negatively impacting any measurements taken by the optical components. Therefore, window 22 may include an opening in the antiglare film that overlaps display 14. An example of an antiglare film having a transparent opening is shown in FIG. 4.

Figure 4:
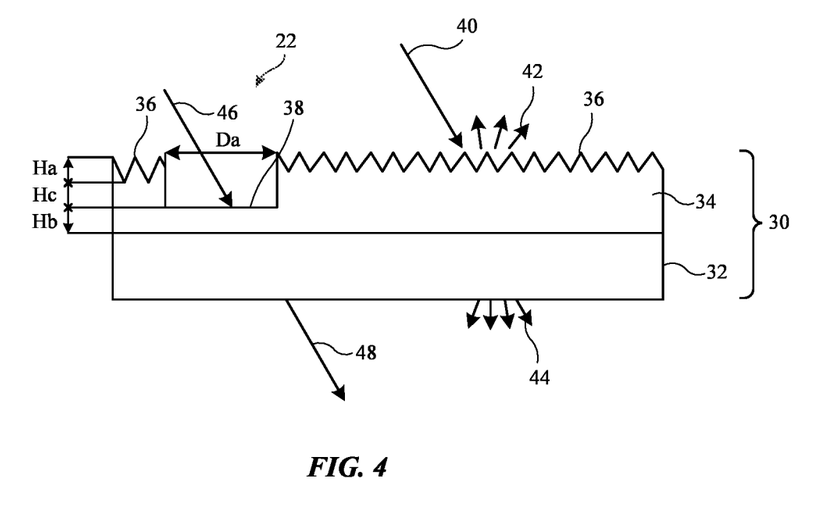
FIG. 4 is a cross-sectional side view of a portion of an illustrative antiglare film with a transparent window in accordance with an embodiment.

As shown in FIG. 4, antiglare film 30 may include substrate 32 and coating layer 34. Substrate 32 may be an optically clear substrate and may be formed from any desired material, such as thermoplastic copolyester (TPC), polyethylene terephthalate (PET), polycarbonate (PC), or triacetate (TAC). However, these materials are merely illustrative. Any material may be used for substrate 32, as desired.

Coating layer 34 may be formed from resin or other transparent material. For example, coating layer may be formed from UV curable resin, or resin curable using other methods, such as visible light, infrared light, electron beam processes, or thermal processes. However, these materials are merely illustrative. Coating layer 34 may be formed from any desired material.

Coating layer 34 may have rough surface 36, which may have protruding surface structures, such as nanostructures. The protruding surface structures may have peaks and valleys. The peaks may be portions of the protruding surface structure that are a maximum height above substrate 32, which the valleys may be portions of the protruding surface structures that are a minimum height above substrate 32. The protruding surface structures may be at least 0.1 microns in height, less than 0.2 microns in height, between 0.1 and 0.2 microns in height, less than 1 micron in height, greater than 0.2 microns in height, or any other desired height. Rough surface 36 may have an RMS surface roughness of 100 nm to 1 micron or other suitable value.

Height $H_a$ may be the distance between the valleys and peaks of the protruding surface structures. Height $H_a$ may be at least 0.05 microns, less than 20 microns, at least 0.1 microns, less than 5 microns, between 0.05 microns and 20 microns, between 0.1 and 5 microns, or any other desired height.

As shown in FIG. 4, light 40 may be incident on rough surface 36. The protruding surface structures on rough surface 36 may diffuse and reflect light 40 as it is incident on rough surface 36. A first portion of the light may reflect as diffusely reflected light 42, and a second portion of the light may be transmit as diffusely transmitted light 44. This diffusely reflected light (e.g., diffusely reflected light 42) may reduce glare when applied over an electronic device display or over other portions of an electronic device.

Antiglare film 30 may also have transparent aperture 22, which may allow light to pass through undiffused. This may allow light-based components, such as cameras, image sensors, proximity sensors, ambient light sensors, or other components, to measure ambient light more accurately than if the light were diffused prior to reaching the light-based components. Transparent aperture 22 in antiglare film 30 may be formed from smooth surface 38 of coating layer 34. As shown in FIG. 4, smooth surface 38 may allow light 46 to pass through antiglare film 30 as undiffused light 48. In this way, antiglare film 30 may have transparent window 22, which may allow for light to pass undiffused to underlying optical components.

Transparent aperture 22 (i.e., smooth surface 38) may have a diameter $D_a$. Diameter $D_a$ may at least 1 mm, less than 20 mm, between 1 mm and 20 mm, at least 2 mm, less than 5 mm, between 2 mm and 5 mm, or any other desired diameter.

Height $H_b$ may be the distance between a lower surface of coating layer 34 (i.e., the surface adjacent to substrate 32) and smooth surface 38. Height $H_b$ may be at least 0 microns, may be less than 250 microns, may be less than 50 microns, may be at least 10 microns, may be between 0 microns and 250 microns, may be between 0 microns and 50 microns, or may be any other desired height.

Height $H_0$ may be the distance between smooth surface 38 and the bottom of the valleys in rough surface 36. Height $H_0$ may be less than 250 microns, greater than −250 microns (e.g., if smooth surface 38 is higher than the valleys in rough surface 36), greater than −50 microns, less than 50 microns, between −250 microns and 250 microns, between −50 microns and 50 microns, or any other desired height.

Although antiglare film 30 is described as a film on substrate 32, this is merely illustrative. Coating layer 34 may be formed directly on a portion of electronic device 10, such as a display cover layer (e.g., a cover glass) or a housing wall. Alternatively or additionally, portions of electronic device 10 may be directly patterned to form an antiglare portion (i.e., antiglare portion 30) and a transparent window. Antiglare film/antiglare portion 30 may be formed in any desired manner.

By having rough surface 36 and smooth surface 38, antiglare film 30 can reduce or eliminate glare for a user of an electronic device by diffusing light incident on rough surface 36, while ensuring that any light-based components can receive undiffused light through smooth surface 38. In this way, underlying light-based components may make more accurate measurements given the undiffused light than if the components received diffused light. An example of antiglare film 30 over a display and an underlying light-based component is shown in FIG. 5.

Figure 5:
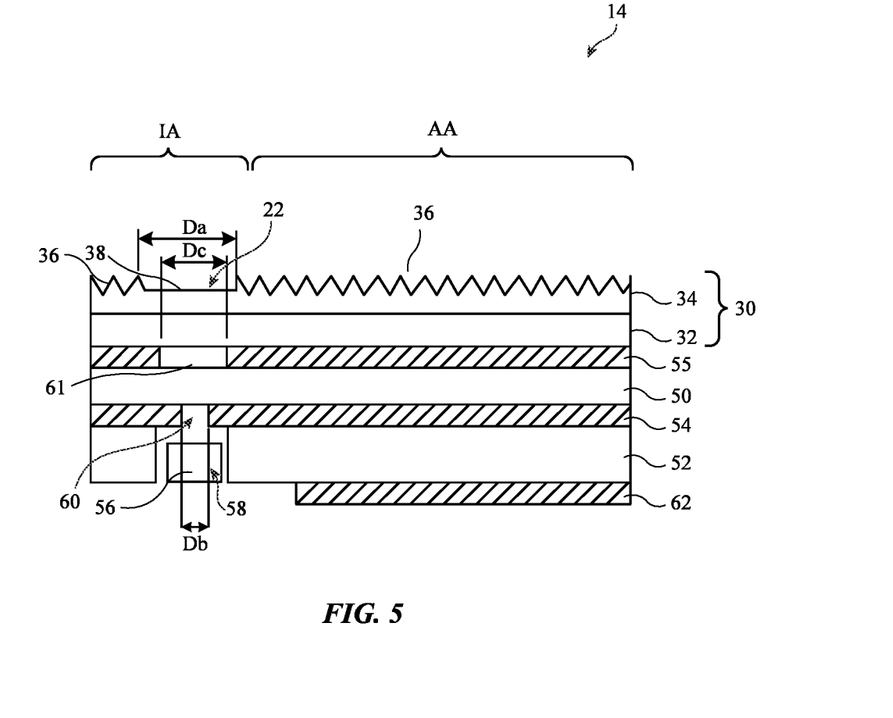
FIG. 5 is a cross-sectional side view of a portion of an illustrative display in an electronic device having a transparent opening in an antiglare film, an opening in a polarizer, and an opening in a masking layer overlapping a light-based component in accordance with an embodiment.

As shown in FIG. 5, display 14 may be a liquid crystal display with color filter substrate 50 (also referred to as upper substrate 50 herein) and thin-film transistor substrate 52 (also referred to as lower substrate 52 herein). Although not shown in FIG. 5, a backlight may emit light that proceeds through display 14 and illuminates color filters on color filter substrate 50. Thin-film transistor substrate 52 may control a liquid crystal layer that selectively allows light to pass through to color filter substrate 50, thereby changing which color filters of color filter substrate 50 are illuminated. This, in turn, may change the light and image outputted by display 14. Although a liquid crystal display is shown in FIG. 5, this is merely illustrative. Any desired display may be used, such as an organic light-emitting diode display or another type of light-emitting diode display. In cases where display 14 is a non-liquid crystal display, substrates 50 and 52 may be upper and lower display substrates, respectively. Upper display substrate 50 and lower display substrate 52 are not limited to being color filter and thin-film transistor substrates.

Front polarizer 55 may be formed on an upper surface of color filter substrate 50, and rear polarizer 62 may be formed on a lower surface of thin-film transistor layer 52. Front polarizer 55 and rear polarizer 62 may polarize light emitted by the display backlight before and after the light has passed through the display layers of display 14 to ensure that only desired light is emitted by display 14. Generally, front polarizer 55 and rear polarizer 62 may be formed on any desired surface within display 14.

As shown in FIG. 5, black masking layer 54 (also referred to as opaque masking layer 54 and masking layer 54 herein) may be interposed between thin-film transistor layer 52 and color filter layer 50. Black masking layer 54 may be patterned in the region over thin-film transistor layer 52 (e.g., the active area AA of display 14) to allow light to selectively pass through, or may be absent from the active area. Black masking layer 14 may be provided in the inactive area IA of display 14 to ensure that components in inactive area IA are not visible from the exterior of display 14 and to match the appearance of display 14 when display 14 is off.

Although black masking layer 54 is shown between color filter layer 50 and thin-film transistor layer 52, this is merely illustrative. Black masking layer 54 may be provided in any desired location within display 14, such as over upper polarizer 55, or between upper polarizer 55 and color filter layer 50.

In FIG. 5, antiglare film 30, which was described above in connection with FIG. 4, may be formed over upper polarizer 55. As described, antiglare film 30 may include substrate 32, which may be in contact with upper polarizer 55. Coating layer 34, which may include rough surface 36 and smooth surface 38, may be formed on substrate 32. Substrate 32 may serve as a cover layer for display 14, and be formed from a material such as plastic, glass, or ceramic, or display 14 may include an optional display cover layer between substrate 32 and the other display layers. Antiglare film 30 may diffuse light incident on rough surface 36 to reduce or eliminate glare when display 14 is viewed by a user of device 10.

Light-based component 56 may be in inactive area IA of display 14. In particular, light-based component 56 may be in opening 58 in thin-film transistor layer 52. However, the location of light-based component is merely illustrative. Light-based component 56 may be in any desired location, such as in the active area AA of display 14. Moreover, opening 58 may extend through multiple display layers, including thin-film transistor layer 52, black masking layer 54, color filter layer 50, and/or upper polarizer 55 if desired. Alternatively, opening 58 may be absent, and light-based component may be formed behind one or more transparent layers of display 14.

Regardless of the position of light-based component 56, antiglare coating 30 may have a transparent window 22 to ensure that light that reaches light-based component 56 is not diffused prior to reaching light-based component 56. As shown in FIG. 5, transparent window 22 may include smooth surface 38, which may allow light to pass through undiffused. As discussed above in connection with FIG. 4, smooth surface 38 may have diameter $D_a$, which may be greater than 1 mm, less than 20 mm, between 1 mm and 20 mm, greater than 2 mm, less than 5 mm, between 2 mm and 5 mm, or any other desired diameter.

Other layers of display 14 may also have openings or transparent portions to allow light to reach light-based component 56 in an unimpeded manner. For example, black masking layer 54 may have opening 60, and upper polarizer 55 may have opening 61. Opening 60 may be formed from a patterned opening in black masking layer 54 (e.g., opening 60 may be an absence of masking material that is surrounded by masking material), or may be a window within black masking layer 54 (i.e., window 60 may be formed in layer 54, and may be a removal of some material, or a bleached portion of the layer). Opening/window 60 may have diameter $D_b$. Opening 61 may be formed from a patterned opening in upper polarizer 55 (e.g., opening 61 may be an absence of polarizer material that is surrounded by polarizer material), or opening 61 may be an unpolarized window in upper polarizer 55 (e.g., opening 61 may be bleached portion of polarizer 55 that includes polarizer material but does not polarize light as it passes through opening 61). Opening 61 may have diameter $D_c$. Although methods of forming openings 60 and 61 have been described, they are merely illustrative. Any desired method may be used to form openings 60 and 61.

Openings 60 and 61 may allow light to reach light-sensing component 56 unimpeded. In particular, opening 60 in black masking layer 54 may transmit at least 50%, at least 75%, less than 95%, or at least 60% of light incident on opening 60 through the opening. Opening 61 in upper polarizer 55 may transmit at least 60%, at least 80%, less than 95%, or at least 70% of light incident on opening 61 through the opening. However, these light transmissions of openings 60 and 61 are merely illustrative. In general, openings 60 and 61 may have any desired light transmission to ensure that light-based component 56 can receive sufficient light to make accurate measurements, produce accurate images, or perform other desired functions.

Opening 61 in upper polarizer 55 may also allow light to pass through without polarizing the light. For example, opening 61 (or transparent polarizer window 61) may have an extinction ratio (p-polarized/s-polarized or s-polarized/p-polarized, as desired) of less than 5:1, less than 10:1, less than 2:1, 5:1, or other desired extinction ratio. In this way, light may pass through opening 61 without being polarized, allowing underlying light-based component 56 to perform accurate ambient light measurements.

Transparent aperture 22, polarizer opening 61, and black masking layer opening 60 may all be aligned with light-based component 56. For example, light-based component 56 may have an aperture through which light is received, and transparent aperture 22, polarizer opening 61, and black masking layer opening 60 may all be alighted with the aperture of light-based component 56. In particular, the centers of transparent aperture 22, polarizer opening 61, black masking layer opening 60, and the aperture of light-based component 56 may all be aligned within a tolerance of less than 0.5 mm, less than 0.25 mm, less than 0.3 mm, or greater than 0.1 mm. However, these tolerances are merely illustrative. The centers of transparent aperture 22, polarizer opening 61, black masking layer opening 60, and the aperture of light-based component may all be aligned within a tolerance of any desired value.

Although openings 60 and 61 are shown in FIG. 5 as through openings, this is merely illustrative. Generally, any of the display layers in display 14 may have windows, which may be through openings, openings that extend partially through the layer, bleached portions of the layer, or other transparent or semi-transparent regions. For example, polarizer 55 may have window 61 and opaque masking layer 54 may have window 60.

Transparent aperture diameter $D_a$ may be greater than the aperture of light-based component 56. For example, transparent aperture diameter $D_a$ may be at least 0.1 mm greater, at least 0.2 mm greater, less than 0.5 mm greater, or any other desired diameter greater than the aperture of light-based component 56. In one example, diameter $D_a$ may be at least 3 mm, at least 4 mm, 3.8 mm, or at least 2.5 mm, while diameter $D_b$ (which may have the same diameter as the aperture of light-based component 56 within 0.1 mm, within 1 mm, or other desired value) may be at least 2 mm, at least 2.5 mm, 2.0 mm, or at least 1.5 mm. However, these diameters are merely illustrative. Any desired diameters may be used for diameter $D_a$ and diameter $D_b$.

Opening 61 in upper polarizer 55 may have diameter $D_c$, which may be greater than opening 60 in black masking layer 54. For example, diameter $D_c$ may be at least 0.1 mm greater, at least 0.2 mm greater, less than 0.5 mm greater, or any other desired diameter greater than diameter $D_b$. Diameter $D_c$ may be greater than 1 mm, less than 20 mm, between 1 mm and 20 mm, greater than 2 mm, less than 5 mm, between 2 mm and 5 mm, or any other desired diameter.

Moreover, diameter $D_c$ may be smaller than or larger than diameter $D_a$. Generally, an absolute value of a difference between diameter $D_a$ and diameter $D_0$ may be less than 0.5, less than 1.0, less than 1.5, greater than 0.75, or less than 2.0. However, this is merely illustrative. Diameters $D_a$ and $D_c$ may have any desired difference.

In one example, diameter $D_a$ may be 3.8 mm and diameter $D_c$ may be 3.0 mm. In another example, diameter $D_a$ may be 3.3 mm and diameter $D_c$ may be 4.6 mm. However, these examples are merely illustrative that diameter $D_a$ may be greater or less than diameter $D_c$ within the ranges previously discussed. Diameters $D_a$ and $D_c$ may have any desired values.

Although antiglare film 30 has been described as being used with a liquid crystal display with openings in various display layers, this is merely illustrative. Antiglare film 30 may be applied over any portion of electronic device 10, such as housing walls with openings for light-based components. Moreover, although antiglare film 30 has been described as a film that is applied over a portion of electronic device 10, this is merely illustrative. Any desired portion of electronic device 10, such as a cover glass over a display or a housing wall may be coated or laminated with an antiglare coating (i.e., antiglare coating 30), or may be directly patterned into rough and smooth portions to form an antiglare portion of the device (i.e., antiglare portion 30).

Alternatively or additionally, antiglare film 30 may be applied over non-liquid crystal displays, such as organic light-emitting diode display, microLED displays, or any other desired displays. Moreover, any desired number of displays in display 14 (e.g., no display layers, all display layers, or some display layers) may have openings aligned with transparent window 22 in antiglare film 30, as desired. Additionally, one or more display layers of display 14 shown in FIG. 5 may be omitted. For example, front polarizer 55, rear polarizer 62, black masking layer 54, and/or one or both substrates 50 and 52 may be omitted from the stack shown in FIG. 5. Regardless of the display or other structure underlying antiglare film 30, a method of forming antiglare film 30 is shown in FIG. 6.

Figure 6:
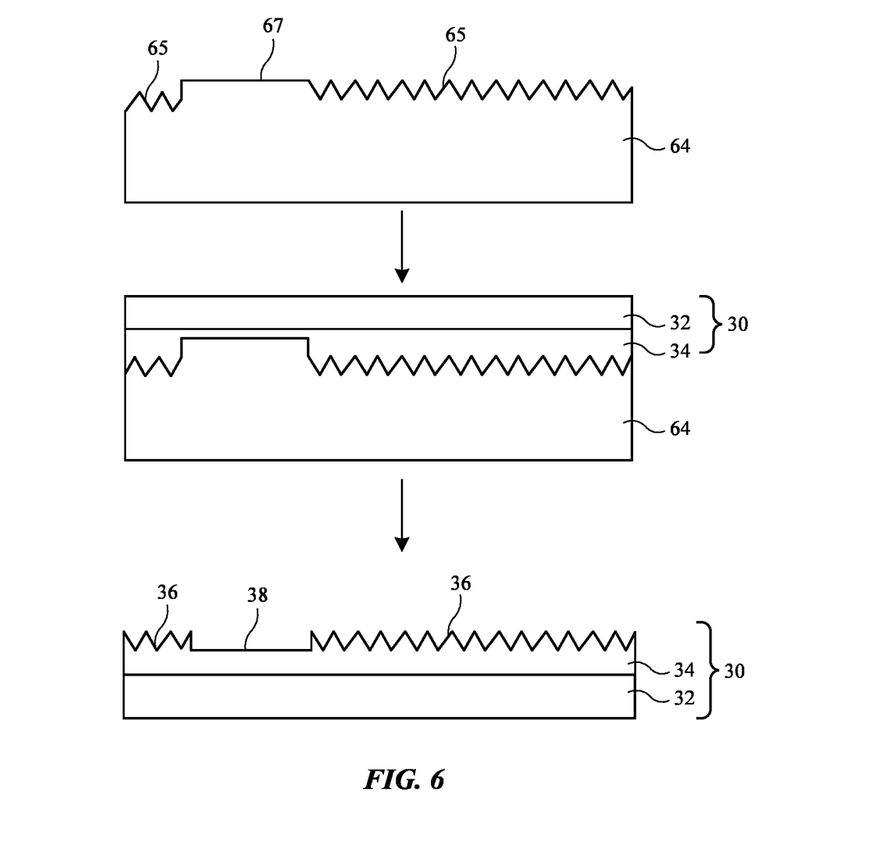
FIG. 6 is a schematic of illustrative steps for forming an antiglare film with a transparent opening in accordance with an embodiment.

As shown in FIG. 6, master 64 may be made. Master 64 may be a hard material, such as glass or metal. In general, however, master 64 may be made of any desired material. Master 64 may have rough surface 65 and smooth surface 67. In one example, master 64 may initially be completely smooth and rough surface 65 may be created using acid etching (e.g., using hexafluorosilicic acid), creating microcracks using chemical etching, followed by polishing (e.g., using hydrofluoric acid or sodium hydroxide), or sandblasting. However, these methods of creating master 64 are merely illustrative. In general, master 64 may be formed using any desired method.

After master 64 has been formed, resin 34 and substrate 32, which together form antiglare film 30, may be applied over master 64. Resin 34 may be UV curable resin, or resin curable using other methods, such as visible light, infrared light, electron beam processes, or thermal processes. Although layer 34 has been described as being formed from using resin, this is merely illustrative. In general, any desired material may be used to form coating layer 34.

Substrate 32 may be a soft mold substrate, such as thermoplastic copolyester (TPC), polyethylene terephthalate (PET), polycarbonate (PC), or triacetate (TAC). However, these materials are merely illustrative. In general, substrate 32 may be formed from any desired material.

While resin 34 and substrate 32 are on master 64, resin 34 may be cured. For example, if resin 34 is formed from UV curable resin, UV light may be used to cure resin 34. If resin 34 is curable by other processes, any desired process may be used to cure resin 34.

After resin 34 has been cured, antiglare film 30 may be removed from master 64. Antiglare film 30 may have substantially the same characteristics as those described above in connection with FIG. 4, including substrate 32, coating layer 34, rough surface 36, and smooth surface 38 (which may in turn form transparent window/aperture 22 over an underlying optical component). Antiglare film 30 may then be applied to an electronic device display or other desired object.

Figure 7A:
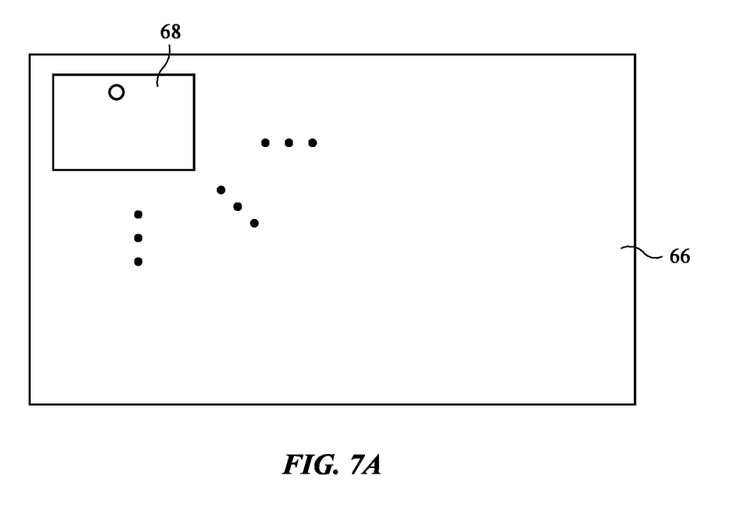
FIG. 7A is a front view of an illustrative sheet of molds used to form antiglare films with transparent openings in accordance with an embodiment.

Although the process of FIG. 6 has been described with respect to making a single antiglare film 30, multiple antiglare films may be made at a time, if desired. For example, FIG. 7A shows master portions 68 on substrate 66. Resin and a substrate, such as resin 34 and substrate 32 may be applied across substrate 66, thereby forming multiple antiglare films when the resin is cured. Substrate 66 may have any desired number of master portions 68, such as at least 12 portions, at least 16 portions, at least 14 portions, or any other desired number. Substrate 66 with master portions 68 may be used in sheet-by-sheet formation of antiglare films.

Figure 7B:
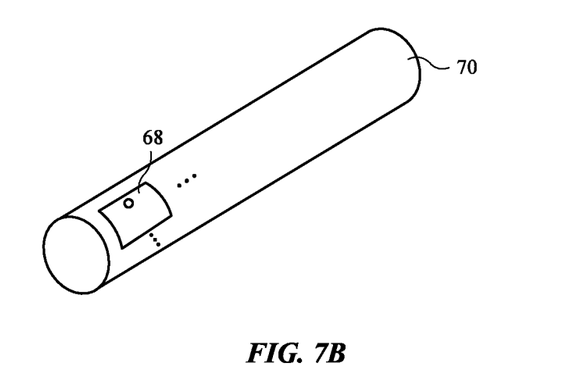
FIG. 7B is a perspective view of an illustrative roll of molds used to form antiglare films with transparent openings in accordance with an embodiment.

FIG. 7B shows alternative manufacturing equipment. In FIG. 7B, master portions 68 are on roller 70. Roller 70 may be used in a roll-to-roll process in which resin and substrates, such as resin 34 and substrate 32, are unwound from a first roll to be patterned by roller 70. While in contact with or after contacting roller 70, the resin may be cured, thereby forming a plurality of antiglare films. Roller 70 may have nay desired number of master portions 68, such as at least 12 portions, at least 16 portions, at least 14 portions, or any other desired number. However, whether the equipment of FIG. 7A, FIG. 7B, or other desired equipment is used, a flowchart showing steps used in forming antiglare film 30 is shown in FIG. 8.

Figure 8:
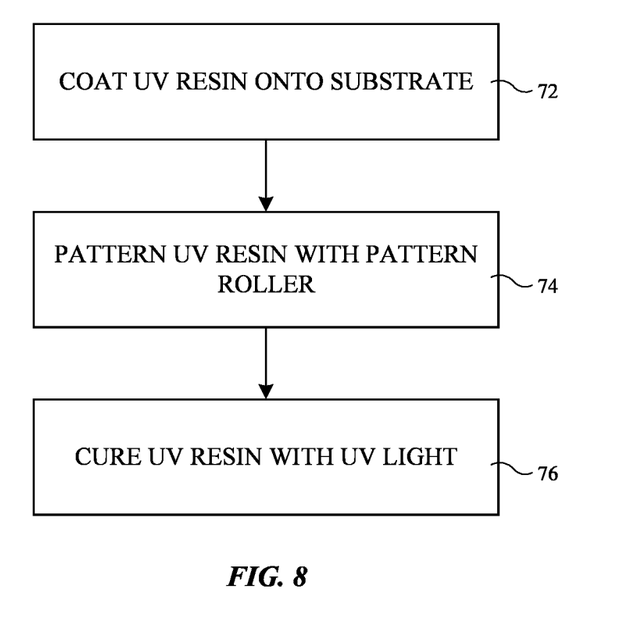
FIG. 8 is a flowchart of illustrative steps used to form antiglare films with transparent openings in accordance with an embodiment.

As shown in FIG. 8, at step 72, an ultraviolet curable resin may be patterned onto a substrate. The ultraviolet curable resin may correspond with resin/coating layer 34 of FIG. 4, and the substrate may correspond with substrate 32 of FIG. 4. The substrate may be a soft mold substrate, such as thermoplastic copolyester (TPC), polyethylene terephthalate (PET), polycarbonate (PC), or triacetate (TAC). However, the substrate is not limited to a soft mold substrate, and any desired substrate may be used, if desired.

At step 74, the ultraviolet curable resin may be patterned with a pattern roller. For example, roller 70 of FIG. 7B may be used to pattern the ultraviolet curable resin into antiglare film portions with rough surfaces and smooth surfaces, such as antiglare film 30 with rough surface 36 and smooth surface 38. However, the use of a pattern roller is merely illustrative. A patterned substrate, such as substrate 66 of FIG. 7A may be used to produce sheets of antiglare films. In general, any desired method of patterning the resin may be used.

At step 76, the ultraviolet resin may be cured with ultraviolet light. As a result, the finished antiglare film may have smooth and patterned regions, as shown in FIG. 4. The smooth regions may allow light to pass through unimpeded. Therefore, the smooth regions may overlap underlying light-based components in electronic devices to ensure that light reaches the light-based components unimpeded and undiffused.

Although steps 72-76 have been described as using ultraviolet resin and using ultraviolet light to cure the resin, this is merely illustrative. In general, any desired material may be used on an underlying substrate to form antiglare film 30. For example, resin curable using other methods, such as visible light, infrared light, electron beam processes, or thermal processes, may be used. Alternatively, other materials may be used to form coating layer 34 of antiglare film 30, if desired.

The foregoing is merely illustrative and various modifications can be made to the described embodiments. The foregoing embodiments may be implemented individually or in any combination.

What is claimed is:

1. An electronic device comprising:
   a housing;
   a light-based component in the housing; and
   an antiglare film having a smooth portion that overlaps the light-based component and a rough portion that surrounds the smooth portion, wherein the antiglare film comprises:
   a substrate, and
   a coating layer on the substrate, wherein the rough portion is a first distance from the substrate along a thickness direction of the substrate, wherein the smooth portion is in the coating layer and is a second distance from the substrate along the thickness direction of the substrate that is less than the first distance, wherein the rough portion and the smooth portion are formed in a single layer, and wherein a difference between the first distance and the second distance is between 50 microns and 250 microns.

2. The electronic device defined in claim 1 wherein the light-based component is selected from the group consisting of: a camera, an ambient light-sensor, and a proximity sensor.

3. The electronic device defined in claim 1 further comprising:
   a display overlapped by the rough portion of the antiglare film.

4. The electronic device defined in claim 3 wherein the display includes a polarizer layer and an opaque masking layer, wherein the polarizer layer and the opaque masking layer respectively have first and second openings that overlap the light-based component, and wherein the light-based component receives light through the smooth portion of the antiglare film, the first opening, and the second opening.

5. The electronic device defined in claim 4 wherein the first opening has a first center, the second opening has a second center, the smooth portion has a third center, and the first, second, and third centers are aligned.

6. The electronic device defined in claim 4 wherein the first opening transmits at least 60% of light incident on the first opening and wherein the second opening transmits at least 50% of light incident on the second opening.

7. The electronic device defined in claim 4 wherein the display includes a display layer having a third opening and wherein the light-based component extends into the third opening.

8. The electronic device defined in claim 1 wherein the rough portion of the antiglare film comprises protruding surface structures having peaks and valleys, and wherein the peaks of the protruding surface structures are separated from the valleys by at least 0.1 microns.

9. The electronic device defined in claim 8 wherein the smooth portion has a first diameter between 1 mm and 20 mm.

10. The electronic device defined in claim 9 further comprising:
    a polarizer with an opening, wherein the opening has a second diameter, and wherein an absolute value of a difference between the first diameter and the second diameter is less than 2 mm.

11. The electronic device defined in claim 1 wherein the coating layer comprises resin and wherein the substrate is a soft-mold substrate.

12. An electronic device comprising:
    a display having an active area defined by an array of pixels and having an inactive area;
    a light-based component overlapped by the inactive area; and
    an antiglare portion having a transparent window through which the light-based component receives ambient light, wherein the antiglare portion has a first surface, an opposing second surface, and a third surface between the first surface and the second surface, the first surface is a first distance from the second surface along a thickness direction of the antiglare portion and the third surface is a second distance from the second surface along the thickness direction of the antiglare portion that is less than the first distance, a difference between the first distance and the second distance is between 50 microns and 250 microns, the first surface has a first roughness, the third surface has a second roughness that is less than the first roughness, the transparent window includes the third surface, and the first, second and third surfaces form a portion of a single layer.

13. The electronic device defined in claim 12 wherein the light-based component is a camera.

14. The electronic device defined in claim 13 wherein the antiglare portion has a rough surface that diffuses light and wherein the transparent window comprises a smooth surface that allows light to pass through undiffused.

15. The electronic device defined in claim 14 further comprising:
   a first housing portion, wherein the display and the camera are in the first housing portion; and
   a second housing portion that is configured to rotate relative to the first housing portion.

16. The electronic device defined in claim 15 further comprising a keyboard in the second housing portion.

17. The electronic device defined in claim 14 wherein the display comprises:
   a first display layer having a first opening; and
   a second display layer having a second opening, wherein the camera receives light through the first opening, the second opening, and the transparent window.

18. An electronic device comprising:
   a housing;
   a display in the housing, wherein the display has an active area and an inactive area, and wherein the display comprises:
      a first display layer with a first window, and
      a second display layer with a second window;
   an antiglare film that overlaps the display, wherein the antiglare film comprises resin, the antiglare film has a single layer with a rough portion and a smooth portion that forms a transparent window, the single layer has a first surface and an opposing second surface, the rough portion and the smooth portion are formed in the second surface, the rough portion is a first distance from the first surface along a thickness direction of the antiglare film, the smooth portion is a second distance from the first surface along the thickness direction of the antiglare film, the second distance is less than the first distance, and a difference between the first distance and the second distance is between 50 microns and 250 microns; and
   a light-based component overlapped by the inactive area of the display, wherein the light-based component has an aperture that is aligned with the first window, the second window, and the transparent window.

19. The electronic device defined in claim 18 wherein the first display layer is a polarizer layer and the second display layer is an opaque masking layer.

* * * * *